United States Patent [19]
Stevens

[11] 3,818,342
[45] June 18, 1974

[54] PULSE OPERATED TACHOMETER WITH HIGHEST SPEED MEMORY

[75] Inventor: Harry S. Stevens, Kansas City, Mo.

[73] Assignee: Harmon Industries, Inc., Grain Valley, Mo.

[22] Filed: Nov. 13, 1972

[21] Appl. No.: 305,798

[52] U.S. Cl. .......... 324/169, 324/166 D, 235/92 CA
[51] Int. Cl. ............................................. G01p 3/48
[58] Field of Search ...... 324/166, 169, 173; 73/491; 235/92 CA, 92 HT; 340/62

[56] References Cited
UNITED STATES PATENTS
1,755,184   4/1930   Martinet .............................. 73/491
3,525,044   8/1970   Richmond ........................... 324/173
3,590,379   6/1971   Fellerman et al. .................. 324/169

OTHER PUBLICATIONS
Richard E. Staerzl, "$6 Electronic Tachometer", Popular Electronics, April 1967, pp. 61–62.

Primary Examiner—Alfred E. Smith
Assistant Examiner—Rolf Hille
Attorney, Agent, or Firm—D. A. N. Chase

[57] ABSTRACT

A tachometer employs decade counters responsive to electrical pulses having a repetition rate dependent upon the speed of rotation of a rotating device, such as the crankshaft of an internal combustion engine. The counters are operational during spaced counting intervals; at the end of each interval, a count is accumulated representing the speed of the device during that interval. This count information is stored in a register until the next succeeding count has been derived. An independent memory is also responsive to the count information and remembers the highest count derived by the counters during any previous counting interval. Normally, digital indicators display the speed of the device as continuously updated by the counters, but a manual selector switch is provided which, when actuated, causes the indicators to display the highest speed previously attained stored in the independent memory. A pulse shaping circuit is provided which adapts the tachometer for use with various types of ignition systems, including the Kettering ignition that employs breaker points from which input impulses are obtained for the tachometer logic.

12 Claims, 5 Drawing Figures

PATENTED JUN 18 1974 3,818,342

PULSE OPERATED TACHOMETER WITH HIGHEST SPEED MEMORY

This invention relates to improvements in pulse operated tachometers and, in particular, to tachometers utilized in automotive vehicles where prior performance information is desired as well as the present rpm, and where the input impulses for the tachometer are obtained from the ignition system of the vehicle engine.

Tachometers with digital presentation have become commercially available for automotive vehicles, and are particularly advantageous for the racing enthusiast. Not only does the digital presentation provide an attractive readout, but the readability of the speed information is essentially instantaneous and is not affected by the angle at which the driver views the face of the tachometer. Accordingly, the usual mental interpolation involved in reading a graduated dial is obviated.

Furthermore, tachometers with digital presentation are readily adapted to completely electronic internal workings, and may employ digital logic circuitry for the processing of the speed information. The elimination of mechanical components provides versatility and a potential for additional features besides the continous monitoring of engine speed. One such feature often desired in performance competition as well as commercial applications is the capability of the instrument to remember the highest rpm previously attained during a performance run or any preceding period of time. In over-the-road trucks and in taxicabs, for example, management may wish to be informed as to whether or not the engine of a vehicle has been overstressed.

However, one disadvantage of the use of digital circuitry in prior tachometers has been the reliance of such circuitry upon pulses produced by the ignition system of the vehicle as an input from which the speed computation is made. Since various types of ignition systems are currently in use, different pulse wave form characteristics are encountered thereby requiring that the input of the tachometer be capable of accommodating pulse information that may vary considerably from installation to installation. In particular, the common Kettering ignition (where breaker points are employed) delivers a time varying impulse of various frequencies at each opening of the points, and high frequency spikes may be produced upon reclosure of the points, thus special pulse shaping must be provided in the input of the tachometer in order to prevent spurious responses that would induce an error into the speed indication.

It is, therefore, an important object of the present invention to provide a tachometer which remembers the highest rpm previously attained.

As a corollary to the foregoing object, it is an important aim of this invention to provide a tachometer as aforesaid which, upon command, indicates the highest rpm previously attained rather than continuing to monitor the present engine rpm as in the normal operational mode.

Another important object of this invention is to provide a tachometer as aforesaid which utilizes digital information processing and employs an independent storage register for remembering the highest rpm previously attained, such register being utilized in conjunction with a digital comparator which continuously compares the previous maximum with the current rpm to maintain the register in an updated condition.

Furthermore, it is an important object of this invention to provide a pulse operated tachometer which may be utilized with various ignition systems of internal combustion engines, including the Kettering ignition, capacitive discharge ignition, solid state ignitions in general, and magnetos.

Yet another object of this invention is to provide such a pulse operated tachometer having an input shaper circuit capable of significantly reducing undesirable amplitude and frequency characteristics of pulses produced by the breaker points of a Kettering ignition, so that discrete, well defined pulses may be derived from the Kettering system for use by the speed determining logic of the tachometer.

Figure 1:
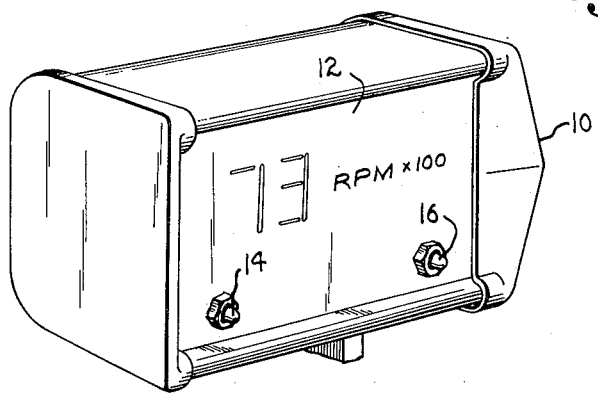
FIG. 1 is a front, perspective view of a tachometer with digital presentation embodying the improvements of the present invention.

Referring initially to FIG. 1, the tachometer of the present invention is shown in a form particularly adapted for mounting to the steering post or dashboard of an automotive vehicle. A housing 10 contains the computing circuitry of the tachometer including the digital display that may be seen through the transparent front face 12. For purposes of illustration, the numerals 7 and 3 forming the first two significant digits of the speed indication are shown. As the legend on the face 12 indicates, the digits are multiplied by 100 and thus represent an engine speed of 7,300 rpm.

The actuator buttons 14 and 16 of a pair of normally open, pushbutton switches may be seen at the lower corners of the front face 12 of the housing 10, within easy reach of the driver of the vehicle. The left-hand button 14 is a "clear" button for resetting a memory to be discussed hereinafter. The right-hand button 16 is a "display" button which, when actuated, causes the information from the mentioned memory to be displayed by the digital indicators. This information is the highest rpm previously attained by the engine since the last time button 14 was depressed to clear the memory.

Figure 2:
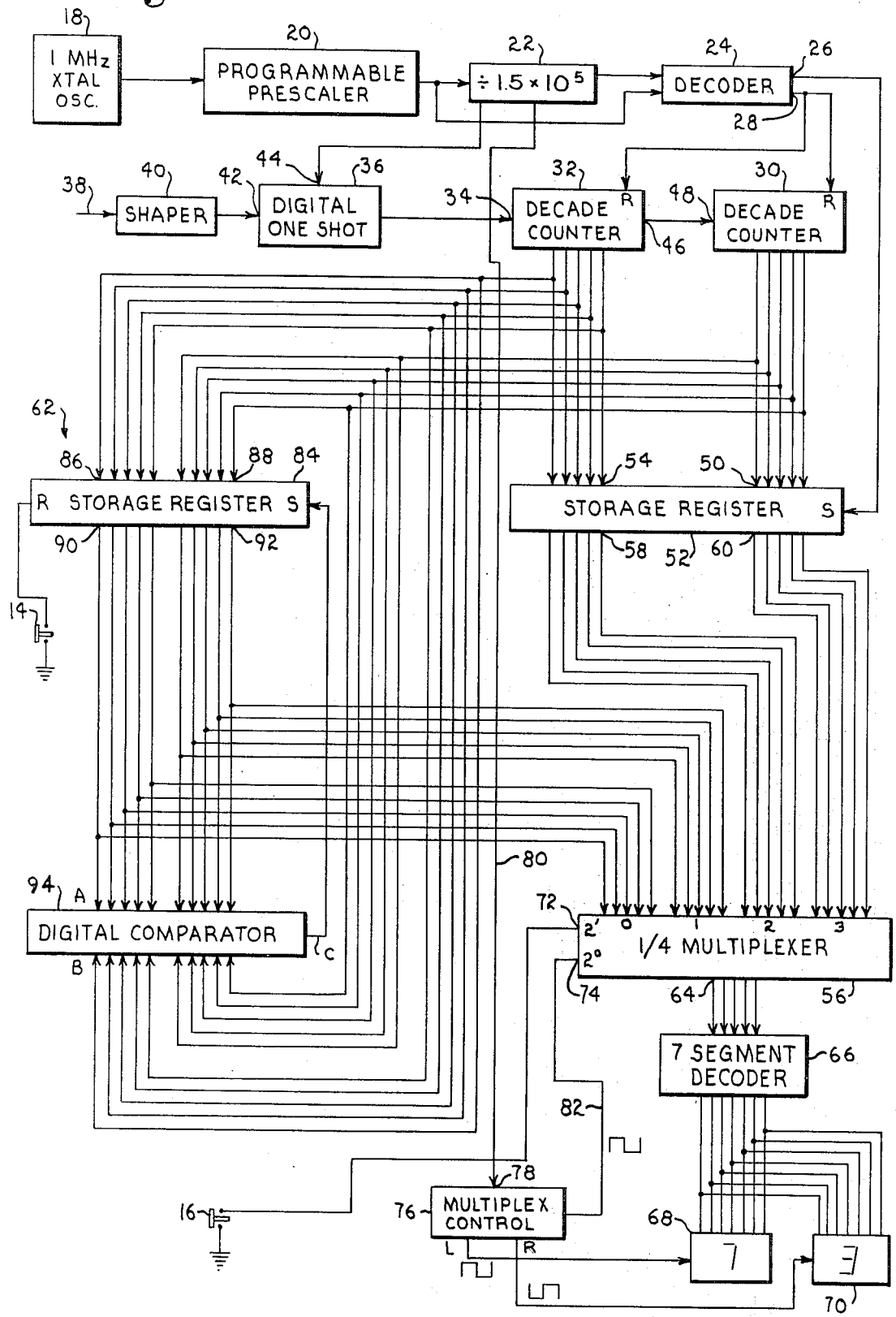
FIG. 2 is a block and logic diagram showing the tachometer circuitry and including the memory for the highest rpm previously attained.

In FIG. 2 the logic of the tachometer computing apparatus is shown in detail. A time base is provided by 1 MHz crystal oscillator 18 whose output is connected to a programmable prescaling network 20. In the case of eight-cylinder engines, scaling is by a factor of unity and hence the output of the network 20 is the same as the output of the oscillator 18 (one pulse occurs every microsecond). For six-cylinder engines, the prescaler 20 is programmed to divide the pulse frequency by 4/3, and for four-cylinder engines the prescaler 20 would be programmed to divide by 2. The prescaler output is fed to a divide by $1.5 \times 10^5$ network identified by the reference numeral 22, and is also fed to a decoder 24. The function of the decoder 24 is to provide a strobe output 26 and a reset output 28 to be discussed more fully hereinafter. It should be understood at this juncture that the output of the network 22 defines a 0.15 sec.

counting interval when prescaler 20 is scaled at unity for an eight-cylinder engine. The strobe output 26 of the decoder 24 delivers a strobe pulse at the end of each counting interval, and the reset output 28 delivers a pulse very shortly thereafter to commence the next counting interval.

A decade counter 30 accumulates a count equal to the first significant digit of the engine speed, and a decade counter 32 accumulates a count equal to the second significant digit of engine speed. Each of the counters 30 and 32 is provided with a reset input R connected to the reset output 28 of the decoder 24. The counter 32 receives pulses at its counting input 34, such pulses being delivered by the output of a digital one shot 36. Impulses from the breaker points (in the case of a Kettering ignition) appear at the input 38 of a shaper circuit 40 and, after appropriate shaping to be discussed below, are delivered to the control input 42 of the one shot 36. For timing purposes, a connection is also made between the network 22 and the timing input 44 of the one shot 36.

The decade counter 32 has a carry output 46 which is connected to the counting input 48 of the decade counter 30, thus the latter responds only to transitions of the counter 32 from 9 to 0. Through the use of a suitable decimal code (as represented by the five leads), the count information in the decade counter 30 is made available to corresponding data inputs 50 of a storage register or latch 52. Similarly, the count information in the decade counter 32 is made available to corresponding data inputs 54 of the register 52. The command for the register 52 to read and store is delivered by the strobe output 26 of the decoder 24, the latter being connected to the strobe input S of the register 52.

A one-out-of-four multiplexer 56 has two sets of inputs which are digitally selectable in accordance with a predetermined code as will be explained. The first set of inputs are designated by the numerals 2 and 3 and receive the count information from the accumulated data outputs 58 and 60 respectively of the register 52. The second set of inputs of the multiplexer 56 are identified by the digits 0 and 1 and receive count information from a memory broadly denoted 62 which remembers the highest rpm attained by the engine. The output of the multiplexer 56 appears at 64 and is delivered to a seven segment decoder 66 that forms a logic interface between the multiplexer output 64 and a pair of seven segment digital indicators 68 and 70. Each of the indicators 68 and 70 comprises a seven segment gas discharge readout assembly for forming digits as depicted by the numeral "7" and "3" best illustrated in FIG. 1.

The multiplexer 56 has a pair of operating inputs 72 and 74 associated with the pushbutton 16 and a multiplex control 76 respectively. It should be noted that the input 72 is coded $2^1$, and that the input 74 is coded $2^0$. The multiplex control 76 may comprise a flip-flop toggled by a pulse frequency which should be at least 100 Hz so that the intermittent operation of the digital display is above the flicker rate the eye can perceive. Such pulses for the operating input 78 of the multiplex control 76 are obtained via a lead 80 extending from the divider network 22. The outputs of the control 76 are identified L and R as they control the left and right digits respectively of the two indicators 68 and 70. Complementary square waves appear at the outputs L and R to alternately excite the indicators 68 and 70 in synchronism with first and second digit information delivered at the output 64 of the multiplexer 56. Note that the wave form illustrated adjacent the lead 82 extending from the control 76 to the input 74 is in phase with the wave form appearing at the output L.

Referring to the memory 62, a storage register or latch 84 receives the same count information at its data inputs 86 and 88 as the corresponding inputs 54 and 50 of the register 52. The accumulated data outputs 90 and 92 of the register 84 are connected to the inputs A of a digital comparator 94. The inputs B of the comparator 94 also receive the count information from the decade counters 32 and 30 so that the same count information is simultaneously made available at both the inputs B and the inputs 86, 88 of the register 84. The comparator 94 has an output C from which a pulse is fed to the strobe input S of the register 84 whenever the count at inputs B is greater than the count at inputs A. The accumulated data outputs 90 and 92 representing the two significant decades of stored count information extend to the 0 and 1 inputs respectively of the multiplexer 56.

Figure 3:
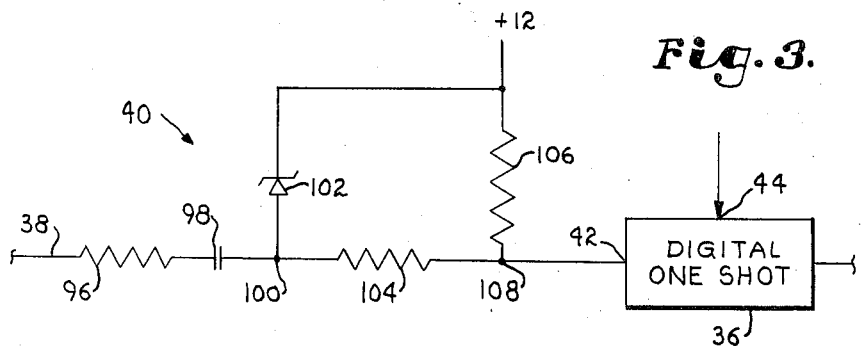
FIG. 3 is an electrical schematic diagram of the imput shaper circuit of the tachometer.

The shaping circuit 40 is shown in detail in FIG. 3. A resistor 96 and a capacitor 98 are connected in series between the input lead 38 and a junction point 100; a zener diode 102 extends from junction point 100 to the positive terminal of the twelve volt DC supply (12 volts is selected for illustration since this is the common supply voltage of vehicle batteries). It should be noted that the anode of the diode 102 is connected to the junction point 100, and that a pair of serially connected resistors 104 and 106 serve as a voltage divider in parallel relationship to the diode 102. The circuit output is at 108 between the two resistors 104 and 106, and is connected with the control input 42 of the digital one shot 36.

Figure 4:
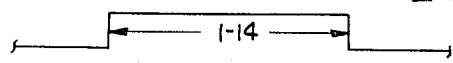
FIG. 4 is a wave form diagram showing the output of the digital one shot.

The output of the digital one shot 36 is illustrated by the wave form in FIG. 4. In the present invention, the one shot 36 is a divide by 15 counter in which the fifteenth state is normal. A negative going pulse at the control input 42 resets the counter to the first state, and at this time the one shot output changes from the low to the high logic level as illustrated in FIG. 4, and remains at this level through the fourteenth counting state. So long as the output is at the high logic level, the control input 42 is disabled; thus the one shot must complete the counting sequence and return to normal (low logic level) before it can be retriggered.

Clocking of the counter is effected by square wave pulses at the timing input 44 having a period of 100 microseconds for an eight-cylinder engine; such pulses are obtained at the appropriate stage of the divider network 22. Since the network 22 is subject to the scaling effected by the programmable prescaler 20, the period of the clocking pulses changes automatically with programming of the prescaler for six or four cylinder engines, i.e. 133 microseconds for six-cylinders and 200 microseconds for four-cylinders.

Figure 5:
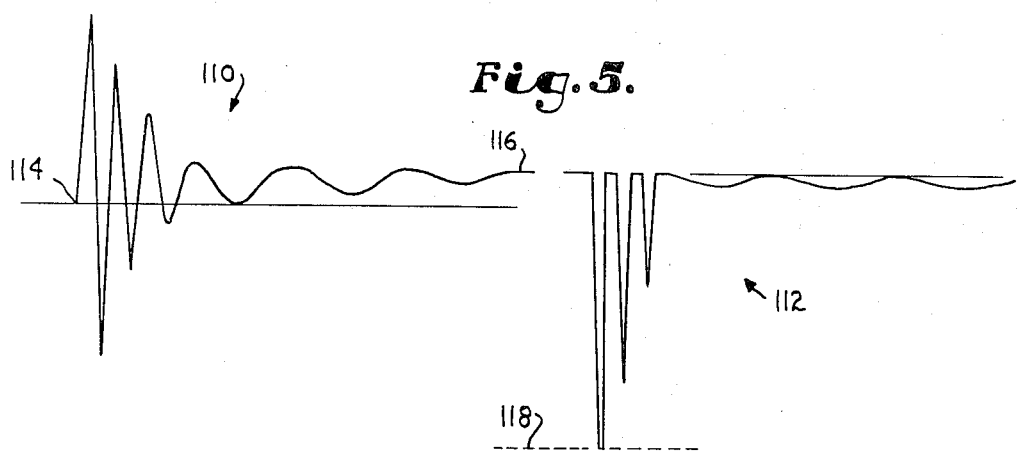
FIG. 5 illustrates pulse wave forms at two points in the input shaper circuit of FIG. 3.

Referring to FIG. 5, the wave form 110 illustrates an oscillatory impulse of the type produced by the opening of the breaker points in a Kettering ignition system. This wave form would appear on the input lead 38 in FIG. 3, and is characterized by relatively high initial frequencies followed by significantly lower frequencies in the nature of damped noise.

The second wave form 112 illustrates the action of the shaping circuit 40 on the impulse 110. The wave form 112 is the shaped pulse appearing at junction point 100 after attenuation of the low frequency noise, amplitude limiting, and conversion to a time-varying unidirectional pulse (negative polarity only).

SPEED COMPUTATION AND MEMORY

The operation of the logic circuitry will first be discussed for the normal operational mode of the tachometer, i.e. continuous monitoring of the speed of the engine. Assuming for purposes of illustration that the tachometer is utilized with an eight-cylinder engine, the strobe output 26 of the decoder 24 delivers a strobe pulse every 0.15 second. The strobe pulse terminates the counting interval, and the next interval commences at the time of delivery of the reset pulse from the output 28. The time spacing between successive strobe and reset pulses is one microsecond as determined by the time base oscillator 18 (unity scaling), thus the counting intervals for practical purposes may be considered to be successively recurring 0.15 second intervals without significant spacing.

When the storage register 52 is strobed, the count information at its data inputs 50 and 54 is read and stored, and the decade counters 30 and 32 are quickly reset by the reset pulse from output 28 of decoder 24, as discussed above. Accordingly, the next counting interval immediately commences but the count information accumulated during the preceeding interval is held in the register 52 and made available to the set of inputs designated 2 and 3 of the multiplexer 56. When the square wave appearing on lead 82 is at the high logic level, the action induced in the multiplexer 56 is represented by $2^0$ at the operating input 74. The other operating input 72 is normally at the high logic level, and goes to the low level only when the display pushbutton 16 is depressed to ground the input as indicated by the symbol. Therefore, summing the operating inputs 72 and 74, $2^1$ is equal to 2 and $2^0$ is equal to 1, for a total of 3. This designates the inputs 3 of the multiplexer 56 as those which are connected with the output 64. Conversely, when the square wave on lead 82 goes to the low logic level, the operating input 74 does not contribute to the sum and the inputs 2 of the multiplexer 56 are connected to the output 64. Thus, it may be seen that the square wave on lead 82 causes the inputs 2 and 3 to be alternately connected to the multiplexer output 64. Simultaneously with this action, the square waves appearing at the outputs L and R of the multiplex control 76 alternately excite the indicators 68 and 70 in synchronism with the alternate coupling of the inputs 2 and 3 of the multiplex 56. Therefore, the count appearing at the data outputs 60 of the storage register 52 is fed to the indicator 68, and the count at the data outputs 58 is fed to the indicator 70.

The foregoing assumed that continuous monitoring of the engine speed was desired. However, if at any time an indication is desired as to the highest previous rpm, the display button 16 is depressed and held and the action of the multiplexer 56 changes. Since the operating input 72 is now at the low logic level, it no longer contributes to the sum and the multiplexer alternates between the inputs 0 and 1.

The same information from the decade counters 30 and 32 is made available to the storage register 84, but such information is only read and stored when the register 84 is strobed by an output pulse from the digital comparator 94. Since the inputs B of the comparator 94 also receive the count information from the decade counters 30 and 32, and the output pulse is only delivered at output C when the count at inputs B is greater than the count at inputs A, the storage register 84 is strobed only when the count presented to its inputs 86 and 88 is greater than a count previously stored in the register 84. Accordingly, the register 84 stores a count representing the highest rpm previously attained, and such count is updated immediately in the event that the speed of the engine subsequently exceeds the highest rpm previously attained. Once the count stored in the register 84 has been read by viewing the digital presentation of the indicators 68 and 70, the operator may clear the register simply by depressing the clear button 14 to momentarily close its associated switch and place the reset input R of the register 84 at the low logic level (represented by the ground symbol). For the purpose of illustrating the logic, it is assumed that the reset input R of the register 84 is normally at the high logic level, enabling the register to store a count appearing at its data inputs 86 and 88 whenever it is strobed.

SHAPER OPERATION

Referring particularly to FIGS. 3–5, the shaping circuit 40 of the present invention is capable of converting impulses from a Kettering ignition, capacitive discharge ignition, solid state ignitions in general, and magnetos into pulses for triggering the one shot 36 with assurance that a failure to trigger or multiple triggering will not occur. The problem is particularly acute with the Kettering ignition or any type where the impulse from breaker points is applied to the input lead 38. Due to the presence of induction (the ignition coil) in the circuit with the breaker points, an oscillatory wave form as illustrated at 110 in FIG. 5 may appear at the lead 38. The opening of the breaker points is indicated at 114 at the beginning of the first positive excursion of the initial, high frequency portion of the impulse. The frequency decreases with time and the amplitude diminishes to present a damped wave form configuration, with the voltage ultimately reached being the +12 supply voltage of the vehicle battery indicated at 116. It should be understood that the amplitudes shown are for purposes of illustration only, in that the peak-to-peak amplitude of the initial positive and negative excursions may vary from approximately 75 to 600 volts depending upon the type of ignition system and the rpm of the engine.

The shaper circuit 40 serves to attenuate the lower frequency portion of the impulse 110, and convert the impulse into a time-varying unidirectional pulse having a maximum amplitude limited by the reverse conduction breakdown voltage of the zener diode 102. The pulse so shaped is illustrated by the wave form 112, the clipping level of the zener diode 102 being indicated at 118.

The output of the shaper circuit 40 is taken across the resistor 106, thus the terminal 108 and the positive side of the 12 volt supply may be considered to be the output terminals of the circuit. Accordingly, due to the forward conduction of the diode 102, positive excursions of the incoming impulse are shorted to the positive supply and thus appear across the resistor 96 and the capacitor 98. The voltages developed across the resistor 96 and the capacitor 98 are divided in accordance with the impedances thereof which, in the case of capacitor 98, is dependent upon the frequency. At the frequency of the initial positive and negative excursions of the impulse 110, the capacitor 98 has substantial reactance and, therefore, is charged by the initial positive half cycle. When the impulse 110 goes negative, diode 102 no longer conducts and the voltage is distributed across the resistors 104 and 106 by a voltage divider action. The cumulative effect is to utilize the entire peak-to-peak voltage available at the initial cycle of the incoming impulse, but with a shift in the reference of the wave form to the positive 12 volt level. Accordingly, the entire wave form 112 is negative with respect to the positive 12 volt reference. This assures the production of a sharp, high voltage initial excursion that is limited in amplitude by the reverse breakdown voltage of the zener diode 102, and enhances the signal to noise ratio. The action of the capacitor 98 is somewhat analogous to a voltage doubler effect since there is an apparent voltage doubling achieved by the shifting of the zero voltage reference. In contrast to rectification, the entire initial peak-to-peak voltage is made available rather than the peak-to-zero voltage of one half cycle.

The resistor 96, capacitor 98, and resistors 104 and 106 also function as a band pass filter in order to attenuate the low frequency portion of the incoming impulse and attenuate any very high frequency spikes (not illustrated) that may be produced at the time that the breaker points reclose. Particularly at low rpms, attenuation of the low frequency noise and possible high frequency spikes is important to prevent inadvertent triggering of the one shot 36 prior to the time that the breaker points next open and generate another impulse.

Referring first to the high pass characteristics of the filter, at lower frequencies the voltage transposing action of the capacitor 98 is considerably reduced in efficiency due to the shunting effect of the resistors 104 and 106 across the zener diode 102. The discharge time of the capacitor 98 through the resistors 104 and 106 is rapid compared to the charging time at the lower frequencies, thus the voltage developed by the low frequency portion of the impulse 110 (following the initial, high frequency portion) is attenuated relative to the voltage peaks at higher frequencies. This may be seen by observing the relative amplitudes of the high frequency peaks of wave form 112 as compared with the succeeding low frequency portion.

The low pass characteristics of the filter are obtained directly by the voltage divider action of the resistor 96 and the capacitor 98, since at high frequencies the reactance of the capacitor 98 is low relative to the resistance presented by the resistor 96. Accordingly, most of the high frequency voltage is developed across the resistor 96 and is dissipated. The net result of the combination of the low pass and high pass characteristics is the establishment of a medium frequency pass band through the range of approximately 5 KHz to 20 KHz. It should be understood that the wave forms 110 and 112 are idealized for purposes of illustration, and that the pass band of 5-20 KHz is not sharply defined. The shaper circuit 40 does, however, provide significant attenuation of frequencies substantially above or below the pass band in order to effectively prevent inadvertent retriggering of the one shot 36 with a minimum of components and a maximum of adaptability to the various types of ignition systems mentioned above.

Preferred values for the components of the shaper circuit 40 are as follows:
Resistor 96 — 3900 ohms
Capacitor 98 — 0.001 mfd.
Resistor 104 — 68,100 ohms
Resistor 106 — 22,600 ohms The total series resistance of the resistors 104 and 106 may remain the same and their relative values changed depending upon the voltage reduction desired by the resistive voltage divider. A ratio would be selected to provide output voltages across resistor 106 compatible with the control input 42 of the one shot 36. It should be appreciated that the reduction provided by resistors 104 and 106 is in the nature of a flat voltage attenuation insensitive to frequency.

The shaper circuit 40 is universal in character and will respond to impulses from a solid state switch (which may be gated by an electromagnetic pickup) as well as from breaker points. Normally, ignition systems that employ transistor switching or other means in lieu of breaker points produce narrow, well-defined pulses without the low frequency noise illustrated in wave form 110. However, in the event that spurious frequencies should be induced, they are of course rejected by the circuit. For example, in capacitive discharge ignition systems where breaker points are used but only to control the gating of a silicon controlled rectifier, the problems with the various frequencies are not as acute as in Kettering ignitions, but the wave form typically has some ringing and may also contain interference induced by the inverter. Accordingly, the shaper circuit of the present invention permits the tachometer to be coupled with any of these systems on a nearly universal basis.

Having thus described the invention, what is claimed as new and desired to be secured by Letters Patent is:

1. A tachometer comprising:
   means for generating electrical pulses having a repetition rate dependent upon the speed of rotation of a rotating device;
   counter means coupled with said generating means for receiving said pulses therefrom;
   timing means coupled with said counter means for rendering the latter operational at spaced intervals of predetermined length whereby, at the end of each interval, a count is accumulated representing the speed of the device during that interval;
   a storage register responsive to each count from said counter means for storing each count until the next succeeding count has been derived;
   memory means responsive to each count from said counter means for remembering the highest count derived by said counter means;
   display means responsive to a count delivered thereto for indicating the speed of the device; and
   selector means coupled with said register, said memory means, and said display means for permitting selective coupling of either said register or said memory means with said display means to render the display means responsive exclusively to the counts successively stored in said register, when said register is selected in order to provide continuous updating of the speed indication, or responsive exclusively to said highest count when said memory means is selected so that said display means will indicate the highest speed previously attained.

2. The tachometer as claimed in claim 1, wherein said memory means includes a second storage register receiving each count from said counter means, and comparator means receiving each count from said counter means and the count stored in said second register, said comparator means delivering an output when the count from the counter means is greater than the count stored in said second register, and wherein said second register stores a received count only in response to said output, whereby the count stored in said second register is said highest count.

3. The tachometer as claimed in claim 1, wherein said selector means has a normal operating condition in which it couples said register with said display means, and wherein said selector means includes manually operable switching means for causing the selector means to assume a second operating condition coupling said memory means with said display means.

4. The tachometer as claimed in claim 1, wherein said display means includes at least a pair of electrically responsive digital indicators for displaying significant digits of the indicated speed, and wherein said selector means includes a multiplexer for alternately exciting said indicators with count information from either said register or said memory means, said multiplexer having a first set of inputs receiving the count stored in said register and a second set of inputs receiving said highest count from said memory means.

5. The tachometer as claimed in claim 4, wherein said memory means includes a second storage register receiving each count from said counter means, and comparator means receiving each count from said counter means and the count stored in said second register, said comparator means delivering an output when the count from the counter means is greater than the count stored in said second register, and wherein said second register stores a received count only in response to said output, whereby the count stored in said second register is said highest count, there being circuit means connecting said second register with said second set of inputs of the multiplexer.

6. The tachometer as claimed in claim 4, wherein said multiplexer has a normal operating condition in which it is responsive exclusively to the count information at said first set of inputs, and wherein said selector means further includes manually operable switching means for rendering said multiplexer responsive exclusively to the count information at said second set of inputs.

7. The tachometer as claimed in claim 1, wherein said pulse generating means includes circuitry responsive to time-spaced oscillatory impulses occurring at said repetition rate, each having a relatively high initial frequency followed by significantly lower frequencies, for converting each impulse into a unidirectional pulse of limited maximum amplitude in which the lower frequencies are attenuated, and a one shot having a control input coupled with the output of said circuitry for receiving said unidirectional pulses.

8. The tachometer as claimed in claim 1, wherein said tachometer is for use in conjunction with internal combustion engines having different numbers of cylinders, and wherein said timing means includes programmable prescaling means for scaling the predetermined length of said intervals in accordance with the number of cylinders, said pulse generating means including a one shot having an output for delivering said pulses to said counter means, there being means interconnecting said timing means and said one shot for automatically controlling the duration of each of said pulses in accordance with the programming of said prescaling means.

9. In a tachometer employing apparatus which responds to discrete electrical pulses having a repetition rate dependent upon the speed of rotation of a rotating device, where said pulses are derived from time-spaced oscillatory impulses occurring at said repetition rate and each having a relatively high initial frequency followed by significantly lower frequencies, the improvement comprising:

a shaper responsive to each oscillatory impulse for attenuating the lower frequency portion thereof, and for converting each oscillatory impulse into a time-varying unidirectional pulse and limiting the maximum amplitude thereof; and output means triggered by the initial excursions of the time-varying pulses from said shaper for delivering said discrete electrical pulses at said repetition rate to said apparatus, said shaper having a pair of output terminals at which said time-varying pulses are delivered, and including a resistor and a capacitor connected between an input connection and an output connection, said oscillatory impulses being applied to said input connection and developing voltages across said resistor and capacitor divided in accordance with the impedances thereof, a unidirectional current-carrying device coupled between said output connection and one of said output terminals, said output connection being coupled with the other of said output terminals, and a resistive shunt across said output terminals, said capacitor being selected to present a small impedance, relative to said resistor, to frequencies above said high initial frequency and said shunt being selected to effect rapid discharging of said capacitor at said lower frequencies, whereby to attenuate frequencies above and below said high initial frequency.

10. The improvement as claimed in claim 9, wherein said output means includes a one shot having a control input for receiving said time-varying pulses from said shaper.

11. The improvement as claimed in claim 9, wherein said output means includes a digital one shot provided with a control input for receiving said time-varying pulses from said shaper, said one shot having a counting period initiated by each pulse from said shaper and during which time said input is disabled.

12. The improvement as claimed in claim 9, wherein said unidirectional current-carrying device is a zener diode for effecting said limiting of the maximum amplitude of said time-varying pulses.

* * * * *